(12) United States Patent
Su et al.

(10) Patent No.: US 12,313,743 B2
(45) Date of Patent: May 27, 2025

(54) METHOD AND ELECTRONIC DEVICE FOR PERFORMING 3D POINT CLOUD OBJECT DETECTION USING NEURAL NETWORK

(71) Applicant: The Hong Kong University of Science and Technology, Hong Kong (CN)

(72) Inventors: Zhaoyu Su, Hong Kong (CN); Yu-Hsing Wang, Hong Kong (CN); Pin Siang Tan, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 482 days.

(21) Appl. No.: 17/896,042

(22) Filed: Aug. 25, 2022

(65) Prior Publication Data
US 2023/0080678 A1    Mar. 16, 2023

Related U.S. Application Data (60) Provisional application No. 63/237,144, filed on Aug. 26, 2021.

(51) Int. Cl.
*G01S 17/89* (2020.01)
*G06N 3/08* (2023.01)

(52) U.S. Cl.
CPC ............... *G01S 17/89* (2013.01); *G06N 3/08* (2013.01)

(58) Field of Classification Search
CPC ...... G01S 17/89; G01S 2205/00; G01S 19/00; G06N 3/0464; G06N 3/0495; G06N 3/08;
(Continued)

(56) References Cited

U.S. PATENT DOCUMENTS 8,874,372 B1   10/2014 Zhu et al.
2009/0295791 A1*  12/2009 Aguera y Arcas ... G06T 15/205
                                                                345/419
(Continued)

FOREIGN PATENT DOCUMENTS

CN        102248947 A     11/2011
CN        104751146 A      7/2015
(Continued)

OTHER PUBLICATIONS

ShaoshuaiShi et al.,"Pv-rcnn: Point-voxel feature set abstraction for 3d object detection," Jun. 2020,Proceedings of the IEEE/CVF Conference on Computer Vision and Pattern Recognition (CVPR), 2020,pp. 10529-10536.*
(Continued)

*Primary Examiner* — Omar S Ismail
(74) *Attorney, Agent, or Firm* — Idea Intellectual Limited; Margaret A. Burke; Sam T. Yip (57) ABSTRACT

A method for performing a 3D point cloud object detection is provided. The method includes: receiving an object data comprising a point cloud of a plurality of sensed points; performing a grid-based key-points extraction on raw data points of the point cloud, so as to obtain one or more key-points; performing a hierarchical point-wise convolution on the raw data points of the point cloud according to the key-points, so as to obtain a plurality of target point-wise features; performing a location-aware 3D RoI pooling operation according to the target point-wise features, so as to obtain pooled point-wise features and pooled 3D voxels corresponding to the pooled point-wise features; performing 3D convolution operations on the pooled 3D voxels, so as to obtain represent data points, wherein each of the represent data points includes a represent feature; and inputting the
(Continued)

represent data points into multi-layer perceptrons to obtain final predictions.

9 Claims, 7 Drawing Sheets

(58) Field of Classification Search
CPC .......... G06N 3/084; G06N 5/00; G06N 20/00; G06T 15/10; G06T 2207/10028; G06T 2207/20081; G06T 2207/20084; G06T 2207/30248; G06T 2210/12; G06T 7/68; G06T 7/73; G06V 10/44; G06V 10/08
See application file for complete search history.

(56) References Cited

U.S. PATENT DOCUMENTS

| | | | |
|---|---|---|---|
| 2020/0019760 A1* | 1/2020 | Ma | G06V 40/16 |
| 2020/0311971 A1* | 10/2020 | Corcodel | B25J 9/0096 |
| 2020/0327690 A1* | 10/2020 | Cai | G06T 7/73 |
| 2021/0042929 A1* | 2/2021 | Zhao | G06V 10/24 |
| 2021/0043002 A1* | 2/2021 | Zeng | G06T 7/74 |
| 2021/0138655 A1* | 5/2021 | Mousavian | G06T 7/70 |
| 2021/0146952 A1* | 5/2021 | Vora | G06V 20/58 |
| 2021/0192254 A1* | 6/2021 | Rejeb Sfar | G06N 3/08 |
| 2021/0256718 A1* | 8/2021 | Gangundi | G06V 10/82 |
| 2022/0130156 A1 | 4/2022 | Shi et al. | |
| 2022/0138969 A1* | 5/2022 | Forsgren | G01S 13/867 382/103 |

FOREIGN PATENT DOCUMENTS

| | | |
|---|---|---|
| CN | 106096503 A | 11/2016 |
| CN | 109034077 A | 12/2018 |
| CN | 113706480 A | 11/2021 |
| CN | 113989797 A | 1/2022 |
| CN | 114332792 A | 4/2022 |
| CN | 114913519 A | 8/2022 |

OTHER PUBLICATIONS

Yin Zhou et al.,"VoxelNet: End-to-End Learning for Point Cloud Based 3D Object Detection," Jun. 2018, Proceedings of the IEEE Conference on Computer Vision and Pattern Recognition (CVPR), 2018,pp. 4490-4497.*
Wenxuan Wu et al.,"PointConv: Deep Convolutional Networks on 3D Point Clouds," Jun. 2019, Proceedings of the IEEE/CVF Conference on Computer Vision and Pattern Recognition (CVPR), 2019, pp. 9621-9627.*
Charles R. Qi et al.,"Frustum PointNets for 3D Object Detection from RGB-D Data," Jun. 2018, Proceedings of the IEEE Conference on Computer Vision and Pattern Recognition (CVPR), 2018, pp. 918-925.*
Xiaozhi Chen et al.,"Multi-View 3D Object Detection Network for Autonomous Driving," Jul. 2017, Proceedings of the IEEE Conference on Computer Vision and Pattern Recognition (CVPR), 2017, pp. 1907-1914.*
Charles R. Qi et al.,"Deep Hough Voting for 3D Object Detection in Point Clouds," Oct. 2019, Proceedings of the IEEE/CVF International Conference on Computer Vision (ICCV), 2019,pp. 9277-9283.*
Charles R. Qi et al., "PointNet: Deep Learning on Point Sets for 3D Classification and Segmentation," Jul. 2017, Proceedings of the IEEE Conference on Computer Vision and Pattern Recognition (CVPR), 2017, pp. 652-658.*
Zetong Yang et al.,"STD: Sparse-to-Dense 3D Object Detector for Point Cloud," Oct. 2017,Proceedings of the IEEE/CVF International Conference on Computer Vision (ICCV), 2019, pp. 1951-1957.*

Alex H. Lang et al.,"PointPillars: Fast Encoders for Object Detection from Point Clouds," Jun. 2019, Proceedings of the IEEE/CVF Conference on Computer Vision and Pattern Recognition (CVPR), 2019, pp. 12697-12702.*
Zhaoyu Su et al.,"DV-Det: Efficient 3D Point Cloud Object Detection with Dynamic Voxelization," Jul. 27, 2021, pp. 1-7.*
Lingfei Ma et al., "Multi-Scale Point-Wise Convolutional Neural Networks for 3D Object Segmentation From LiDAR Point Clouds in Large-Scale Environments," Feb. 2, 2021, IEEE Transactions on Intelligent Transportation Systems, vol. 22, No. 2, Feb. 2021,pp. 821-833.*
Chaitanya Kaul et al.,"SAWNet: A Spatially Aware Deep Neural Network for 3D Point Cloud Processing," May 18, 2019,arXiv: 1905.07650v1,pp. 1-6.*
Yue Wang et al.,"Pillar-Based Object Detection for Autonomous Driving," Nov. 17, 2020, Computer Vision—ECCV 2020 Conference paper,ECCV 2020, LNCS 12367,2020,p. 18-28.*
Shaoshuai Shi et al.,"PointRCNN: 3D Object Proposal Generation and Detection from Point Cloud," Jun. 2019, Proceedings of the IEEE/CVF Conference on Computer Vision and Pattern Recognition (CVPR), 2019, pp. 770-777.*
Hong Kong Short-term Patent Application Search Report of the corresponding application No. 32022059085.7 mailed on Sep. 23, 2022.
Xiaozhi Chen et al., "Multi-View 3D Object Detection Network for Autonomous Driving," 2017 IEEE Conference on Computer Vision and Pattern Recognition, 2017, pp. 6526-6534.
Benjamin Graham et al., "3D Semantic Segmentation with Submanifold Sparse Convolutional Networks," 2018 IEEE/CVF Conference on Computer Vision and Pattern Recognition, 2018, pp. 9224-9232.
Alex H. Lang et al., "PointPillars: Fast Encoders for Object Detection from Point Clouds," 2019 IEEE/CVF Conference on Computer Vision and Pattern Recognition, 2019, pp. 12689-12697.
Charles R. Qi et al., "Deep Hough Voting for 3D Object Detection in Point Clouds," 2019 IEEE/CVF International Conference on Computer Vision (ICCV), 2019, pp. 9276-9285.
Charles R. Qi et al., "Frustum PointNets for 3D Object Detection from RGB-D Data," 2018 IEEE/CVF Conference on Computer Vision and Pattern Recognition, 2018, pp. 918-927.
Charles R. Qi et al., "PointNet: Deep Learning on Point Sets for 3D Classification and Segmentation," 2017 IEEE Conference on Computer Vision and Pattern Recognition, 2017, pp. 77-85.
Charles R. Qi et al., "PointNet++: Deep Hierarchical Feature Learning on Point Sets in a Metric Space," arXiv:1706.02413v1, 2017, pp. 1-10.
Shaoshuai Shi et al., "PV-RCNN: Point-Voxel Feature Set Abstraction for 3D Object Detection," 2020 IEEE/CVF Conference on Computer Vision and Pattern Recognition, 2020, pp. 10526-10535.
Shaoshuai Shi et al., "PointRCNN: 3D Object Proposal Generation and Detection from Point Cloud," 2019 IEEE/CVF Conference on Computer Vision and Pattern Recognition, 2019, pp. 770-779.
Shaoshuai Shi et al., "Part-A2 Net: 3D Part-Aware and Aggregation Neural Network for Object Detection from Point Cloud," arXiv:1907.03670v1, 2019, pp. 1-10.
Yue Wang et al., "Pillar-based Object Detection for Autonomous Driving," arXiv: 2007.10323v2, 2020, pp. 1-18.
Zetong Yang et al., "STD: Sparse-to-Dense 3D Object Detector for Point Cloud," 2019 IEEE/CVF International Conference on Computer Vision (ICCV), 2019, pp. 1951-1960.
Yin Zhou et al., "VoxelNet: End-to-End Learning for Point Cloud Based 3D Object Detection," 2018 IEEE/CVF Conference on Computer Vision and Pattern Recognition, 2018, pp. 4490-4499.
Qingyong Hu et al., "RandLA-Net: Efficient Semantic Segmentation of Large-Scale Point Clouds," 2020 IEEE/CVF Conference on Computer Vision and Pattern Recognition (CVPR), 2020, pp. 11105-11114.

* cited by examiner

METHOD AND ELECTRONIC DEVICE FOR PERFORMING 3D POINT CLOUD OBJECT DETECTION USING NEURAL NETWORK

FIELD OF THE INVENTION

The present invention generally relates to object detection, and in particular, to a method and electronic device for performing a 3D point cloud object detection using grid-based key-points extraction and hierarchical point-wise voxelization.

BACKGROUND OF THE INVENTION

Algorithms for point cloud detection are receiving increasing attention nowadays, thanks to the bloom of robotics and autonomous driving industry. Detection algorithms need to run at the real-time speed, but they are usually deployed on the edge devices, which has limited computation resources, and that asks for a good balance between computation efficiency and accuracy.

The existing point cloud detection methods can be roughly classified into two groups: Grid-based methods and point-wise methods.

Figure 2A:
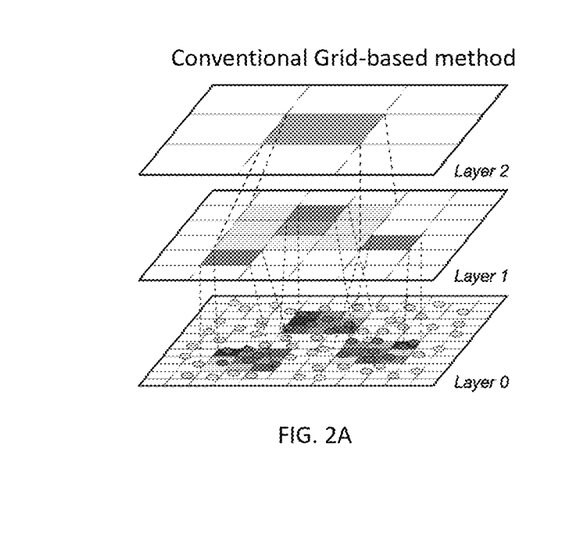
FIG. 2A depicts a schematic diagram illustrating a conventional grid-based method for down-sampling data points.

Grid based methods (Chen et al. 2017; Graham, Engelcke and Van Der Maaten, 2018; Zhou and Tuzel 2018; Shi et al. 2019) basically follow the same pattern as the 2D image cases: they transform the point cloud into regular grids representations like 3D voxels or 2D Bird-Eye-View (BEV) projections, then use 3D or 2D convolutional neural networks (CNNs) to extract features and get bounding box predictions. However, the transformation from point cloud to regular grids leads to the information loss, and due to the quantization issue, the feature maps at high-level CNN layers are leak of precise representations regarding locations (as illustrated by FIG. 2A), which is essential for an accurate bounding box regression.

Figure 2B:
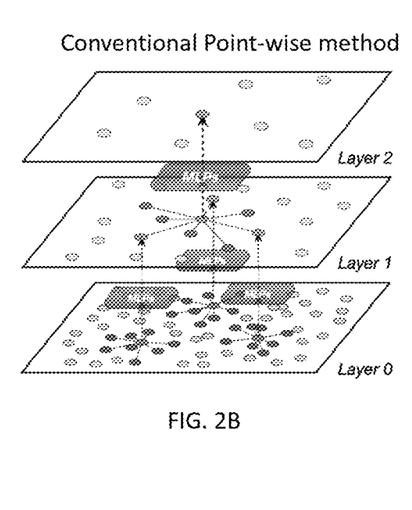
FIG. 2B depicts a schematic diagram illustrating a conventional point-wise method for down-sampling data points.

On the other hand, developed from the pioneer work PointNet (Qi et al. 2017a; Qi et al. 2017b), point-wise methods directly take raw points as input and learn point-wise feature representations from coordinates via multi-layer perceptrons (MLPs). As illustrated by FIG. 2B, they no longer suffer from the quantization problem like conventional convolutions, however, the precision comes at a price: learning representations solely from a list of point coordinates is by no means an easy task, and therefore, complicated MLPs with heavy computational cost are usually involved in these methods.

There are also attempts trying to combine grid-based methods and point-wise methods together. E.g., in PV-RCNN (Shi et al., 2020), these two methods are stacked in an alternate pattern and merged at the framework level. Despite the impressive accuracy, however, the inherent limitations of both methods are still there, and the inference speed is still unsatisfying.

Currently, the mainstream point cloud detection methods can run at a speed of ~20 fps on KITTI dataset (few can reach ~40 fps (Wang et al., 2020)) on a powerful dedicated GPU, with a 90 degree horizontal front-view FOV (Field of View). This is apparently not sufficient for the real-world scenario, where the FOV is 360 degree with a sampling rate of 20 Hz (for LiDAR scanners), not to mention the limited computation hardware resources deployed on the edge devices.

The point-wise 3D detection methods gain lots of attention after the success of PointNet (Qi et al. 2017a), and PointNet is still the most widely adopted perceptron unit in many point-wise detection methods. F-PointNet (Qi et al. 2018) is the first work to apply PointNet into 3D detection, it crops 3D point cloud frustums based on the detection results from 2D images, and uses PointNet to further refine the predictions afterwards. STD (Yang et al. 2019) also employs PointNet++ as the backbone for features extraction, and proposes PointsPool for efficient proposal refinement. Similarly, PointRCNN (Shi et al. 2019) also leverages PointNet++ to generate RoI proposals directly from the entire 3D scene, and deep-hough-voting (Qi et al. 2019) uses voting strategy for better feature aggregation yielding from PointNet++.

PointNet series relies on the additional MLPs (function like a sub-network in each layer) to decode points geometry from coordinates, and therefore is a computationally intensive framework. Hence, the above mentioned point-wise 3D detection methods usually run only at ~10 fps (for KITTI) on a dedicated GPU, which is relatively slow.

By converting the entire point cloud into 3D voxels or Bird-Eye-View (BEV) projections, most of the ideas in 2D image detections can be transferred to the 3D seamlessly. In works like MV3D (Chen et al. 2017), 3D point clouds are transformed to the BEV or front-view projections and fed into 2D CNNs for futher interpretations. Some other works also adopt the similar implementation, and fuse the LiDAR point cloud with 2D camera images at the feature map level.

Therefore, problems such as: how to extract key-points from hundreds of thousands of points efficiently, and how to construct 3D voxels on-the-fly during the network propagation are the subjects to which people skilled in the art devote.

SUMMARY OF THE INVENTION

In this work, a novel framework for rapid 3D point cloud detection is provided. Instead of transforming point clouds into 2D bird eye view projections, the data in the 3D space is directly parsed to have impressive efficiency and accuracy. To achieve this goal, a hierarchical point-wise convolution method is provided, which applies 3D convolution in a point-wise fashion. By doing so, the point cloud geometry can be preserved with 3D voxels, and thus it waives the dependence on expensive MLPs to learn from point coordinates. Regarding the provided grid-based point-wise 3D detection, convolutions are particularly good at dealing with data organized in regular grids, and since the point cloud geometry is preserved in the 3D voxels, it no longer has to be learnt from the coordinates like point-wise methods.

In accordance to one aspect of the present invention, a computer-implemented method for performing a 3D point cloud object detection using grid-based key-points extraction and hierarchical point-wise voxelization by an electronic device is provided, wherein the electronic device includes one or more processor. The method includes: receiving, by a processor of the electronic device, an object data comprising a point cloud of a plurality of sensed points, wherein the point cloud comprises a plurality of raw data points respectively corresponding to the sensed points, and each of the raw data points comprises a point coordinate of corresponding sensed point and a corresponding point-wise feature with one or more channels; performing, by the processor, a grid-based key-points extraction on the raw data points of the point cloud, so as to obtain a key-point set having one or more key-points among the raw data points; performing, by the processor, a hierarchical point-wise convolution on the raw data points of the point cloud according to the key-point set by a neural network having one or more successive convolution blocks, so as to obtain a plurality of target point-wise features corresponding to a plurality of target data points; performing, by the processor, a location-aware 3D RoI pooling operation according to the target point-wise features, so as to obtain pooled point-wise features and pooled 3D voxels corresponding to the pooled point-wise features; performing, by the processor, 3D convolution operations on the pooled 3D voxels, so as to obtain represent data points, wherein each of the represent data points includes a represent feature; and inputting, by the processor, the represent data points into multi-layer perceptrons, so as to obtain final predictions, wherein the final predications is outputted as one or more 3D object detected from the point cloud.

In accordance to another aspect of the present invention, an electronic device is provided, and the electronic device comprises a processor configured to execute machine instructions to implement the method described above.

BRIEF DESCRIPTION OF THE DRAWINGS

Embodiments of the invention are described in more details hereinafter with reference to the drawings, in which.

DETAILED DESCRIPTION:

In the following description, a method and an electronic device configured to execute the same for performing a 3D point cloud object detection using neural network and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
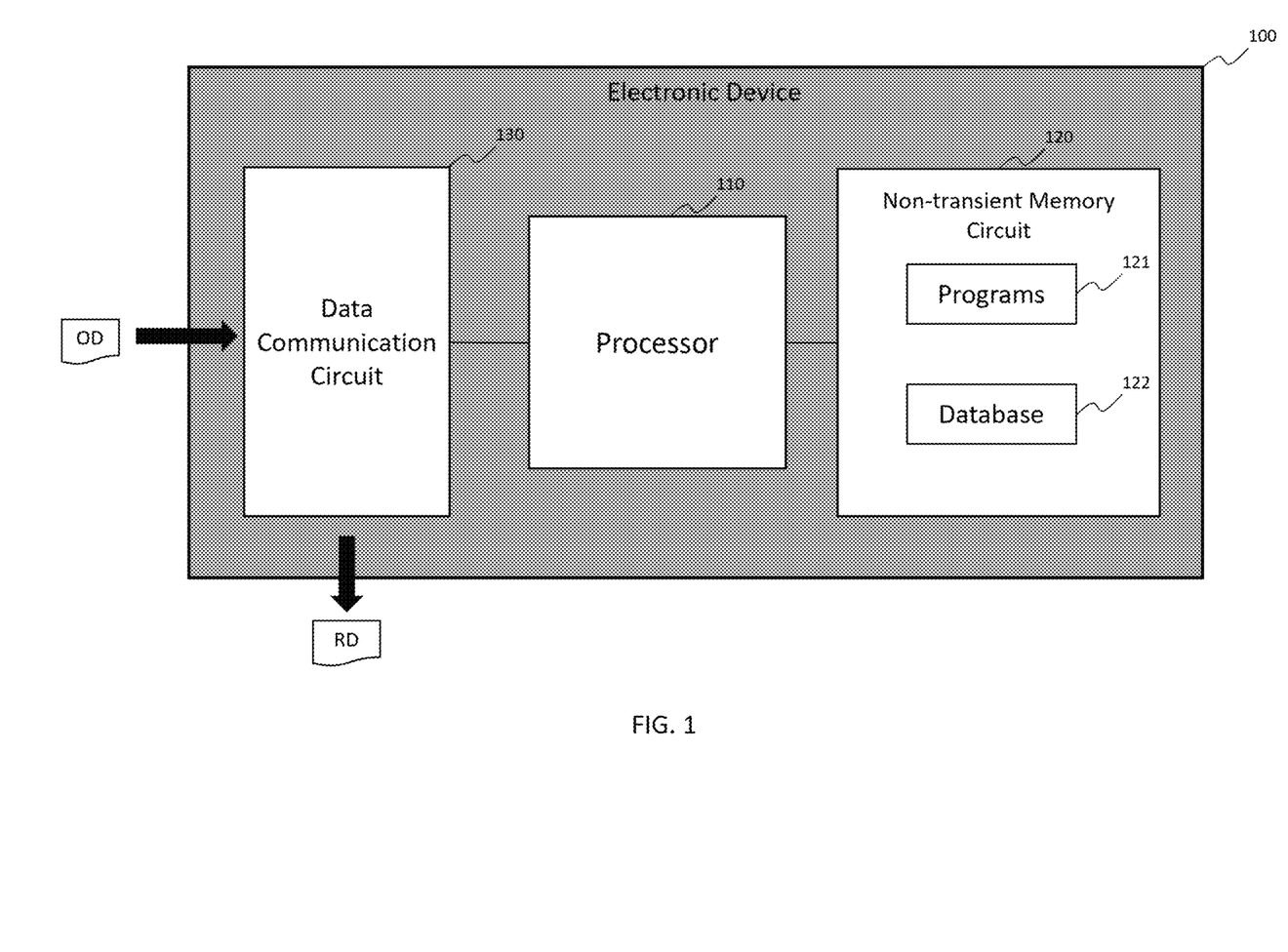
FIG. 1 depicts a block diagram illustrating an electronic device a in accordance with one embodiment of the present invention.

Referring to FIG. 1 in the following description. In accordance with various embodiments of the present invention, provided is an electronic device 100 that includes a processor 110, a non-transient memory circuit 120 and a data communication circuit 130.

The non-transient memory circuit 120 is configured to store machine instructions (or programs) 121 and to host the database 122. The database 122 may be used to store parameters/models of the provided neural network, object data OD, and/or result data RD. The data communication circuit 130 is configured to establish the network connection(s) for receiving the object data OD, and the network connection(s) can be wired or wireless data communication connection(s). Furthermore, the data communication circuit 130 is configured to establish a further network connection for sending the result data RD. For example, the object data OD can be sent by another electronic device (e.g., camera, LiDAR or monitoring device), and the object data OD includes a point cloud of a plurality of sensed points (sensed by LiDAR, for example), wherein the point cloud comprises a plurality of raw data points respectively corresponding to the sensed points, and each of the raw data points includes information such as: a point coordinate of corresponding sensed point in the point cloud and a corresponding point-wise feature with one or more channels (e.g., the feature may include the point coordinates, intensity and reflectivity). The result data RD may include the generated final predictions.

The processor 110 executes the machine instructions 121 to implement methods provided by the presented disclosure.

In the provided method, a grid-based convolution is the basic perceptron unit. But instead of downsampling a point cloud with fixed stride as conventional convolutions, the same strategy as point-wise methods is adopted: the downsampling is performed based on the raw data points with special algorithms. In this way, the point-wise method and grid-based method are fused at the perceptron level followed by the provided LA-RoI-Pooling and IoU loss function, and extraordinary efficiency can be achieved.

Figure 2C:
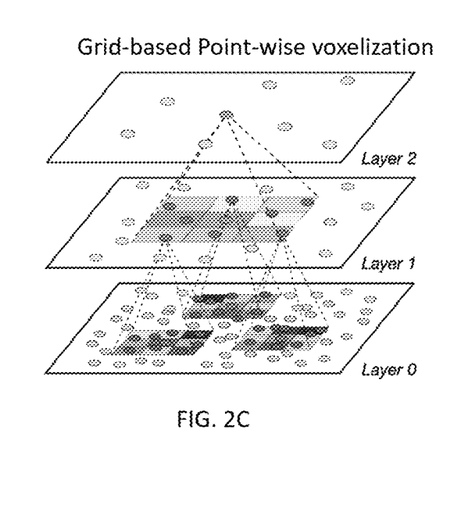
FIG. 2C depicts a schematic diagram illustrating a provided grid-based point-wise method for down-sampling data points.

Referring to FIG. 2C, a new method that fuses grid-based methods and point-wise methods at the perceptron level. As shown in FIG. 2C, given a point cloud (e.g., raw data points on layer 0), key-points (e.g., the center data point of each of the 9-grids sets in Layer 0) are extracted first according to regular grids and neighbouring points (e.g., dark gray data points around each key-point) around each key-point are gathered/queried like the point-wise methods. The extracted key-points and their features are disposed on Layer 1 after the layer 0. Then, on Layer 1, the aforementioned procedures performed on Layer 0 are repeated. e.g., the center data point of the 9-grids set in Layer 1 is extracted according to the regular grids and neighbouring points (the extracted key-points). Finally, the center data point of the 9-grids set in Layer 1 is disposed on Layer 2, with features from the inputs are encoded efficiently. Instead of parsing from point coordinates, local-scale 3D voxels are parsed to preserve the point geometry, and features are encoded with 3D convolutions. By doing so, expensive MLPs process can be prevented and the corresponding quantization problem can be waived as well.

Figure 3:
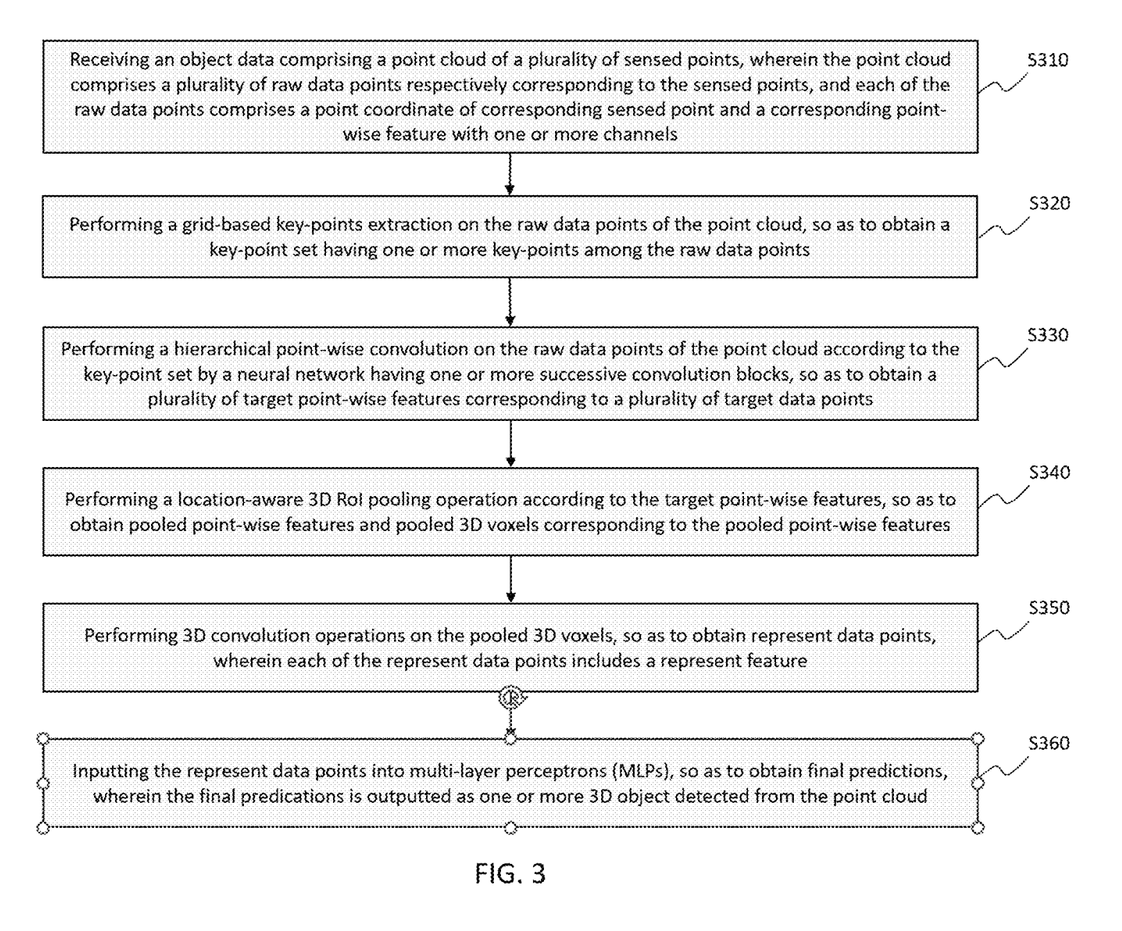
FIG. 3 depicts a flowchart of performing a 3D point cloud object detection using neural network.

Referring to FIG. 3, in step S310, the processor 110 receives an object data comprising a point cloud of a plurality of sensed points, wherein the point cloud comprises a plurality of raw data points respectively corresponding to the sensed points, and each of the raw data points comprises a point coordinate of corresponding sensed point and a corresponding point-wise feature with one or more channels.

Next, in step S320, the processor 110 performs a grid-based key-points extraction on the raw data points of the point cloud, so as to obtain a key-point set having one or more key-points among the raw data points. Data point is also called as "point" in the following description.

Figure 5A:
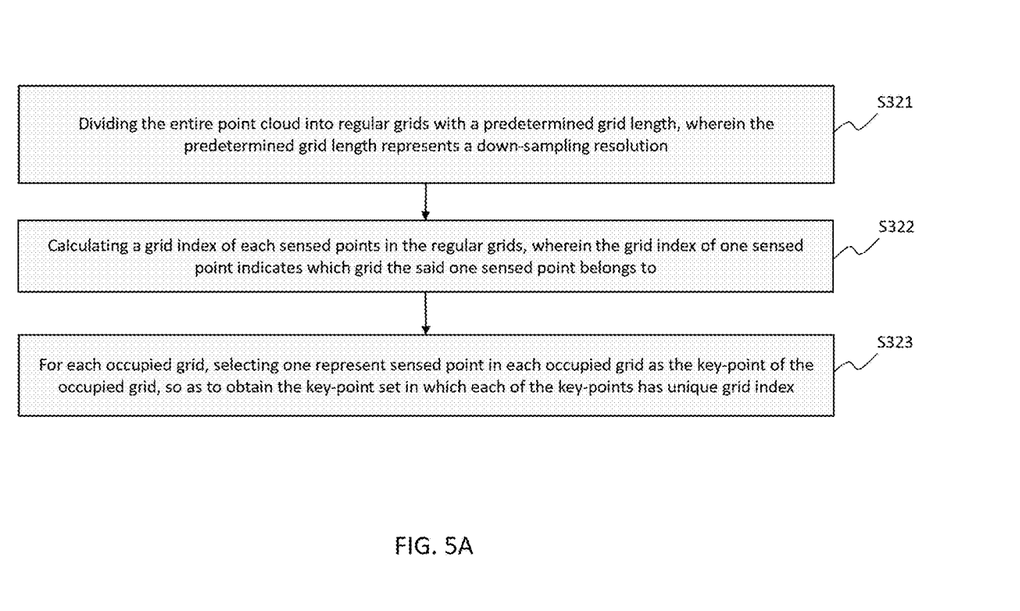
FIG. 5A depicts a flowchart of step S320 in FIG. 3.

Specifically, referring to FIG. 5A, the step of performing the grid-based key-points extraction on the raw data points of the point cloud includes: dividing the entire point cloud into regular grids with a predetermined grid length (S321), wherein the predetermined grid length represents a down-sampling resolution; calculating a grid index of each sensed points in the regular grids (S322), wherein the grid index of one sensed point indicates which grid the said one sensed point belongs to; and for each occupied grid, selecting one represent sensed point in each occupied grid as the key-point of the occupied grid, so as to obtain the key-point set in which each of the key-points has unique grid index (S323).

In more detail, the grid-based key-points extraction also called as grid based point down-sampling, which runs almost as efficient as random sampling, while keeps the similar functionality as FPS(farthest point sampling).

Figure 4A:
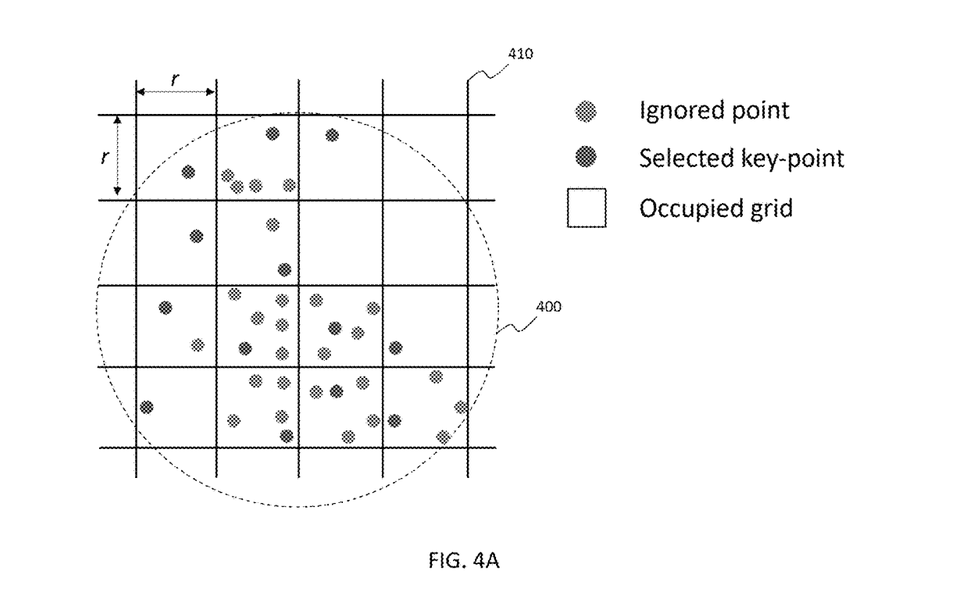
FIG. 4A depicts a schematic diagram illustrating a key-point extraction method.

Referring to FIG. 4A, for a point cloud $S=\{(p_i, f_i): i=1,2,\ldots,N\}$, $p_i \in \mathbb{R}^3$ is the point coordinate, $f_i \in \mathbb{R}^c$ is the point-wise feature with channel c, N is the total number of data points in that point cloud, and given the down-sampling resolution r, dividing the entire point cloud 400 into regular grids 410 with grid length r.

For every point $p_i$ in $\{P\}$ with coordinate $[p_i^x, p_i^y, p_i^z]$ calculating its corresponding grid index as $$\left[\left\lfloor\frac{p_i^x}{r}\right\rfloor, \left\lfloor\frac{p_i^y}{r}\right\rfloor, \left\lfloor\frac{p_i^z}{r}\right\rfloor\right],$$

indicating which grid the point will fall into. Next, randomly selecting one point in each grid as our down-sampling output (i.e., extracted key-point), unless the grid is not occupied by any points. In other words, in the embodiment, the key-point of each grid is selected randomly, so as to speed up the whole key-point extraction.

Straightforward as this strategy may sound, but not the implementation, especially for the balance between time and space complexity, and therefore, different implementations are adopted for inference (generating the final predictions) and training phase separately.

In inference phase, speed matters more than memory efficiency, and to this end, the implementation is to create a 3D grid buffer with size $$\left\lfloor\frac{W}{r}\right\rfloor \times \left\lfloor\frac{L}{r}\right\rfloor \times \left\lfloor\frac{H}{r}\right\rfloor$$

first, where the W, L and H stands for the dimensions of the input point cloud; then, calculating the grid index for every point and fit the point into the corresponding grid buffer location. Each grid buffer location is writable for only "one time", which means it will become read-only once it has been occupied, so that the other points with the same grid index will not overwrite the same buffer location again. With this setup, it achieves the O(n) complexity, but the speed also comes at a price: the 3D grid buffer has to be allocated in memory space first. Fortunately, it usually will not be a problem for most of the cases, e.g., for Waymo Open Dataset with input space of 150m×150m×6m, when the r is 0.1m, the total RAM consumption by this inference implementation is around 500MB (with float32), while the speed is 5× faster than our training implementation, and another good news is that, it can reuse the same down-sampling result in the subsequent model layers, as long as the down-sampling ratio r remains unchanged.

By contrast, in training phase, it aims at fitting as large batch size into GPU as possible, while the time consumption is less important. Following this idea, it calculates the grid index $$\left[\left\lfloor\frac{p_i^x}{r}\right\rfloor, \left\lfloor\frac{p_i^y}{r}\right\rfloor, \left\lfloor\frac{p_i^z}{r}\right\rfloor\right]$$

for every point first, then sort the points according to their grid indexes, and fetch the points with unique grid indexes as final results. By doing so, the requirement for the memory-hungry grid buffer implementation is waived. Since sorting operation is involved here, the approximate complexity is O(n log n), not as ideal as O(n), but still much faster than the FPS method.

Returning to FIG. 3, in step S330, the processor 110 performs a hierarchical point-wise convolution on the raw data points of the point cloud according to the key-point set by a neural network having one or more successive convolution blocks, so as to obtain a plurality of target point-wise features corresponding to a plurality of target data points.

Figure 5B:
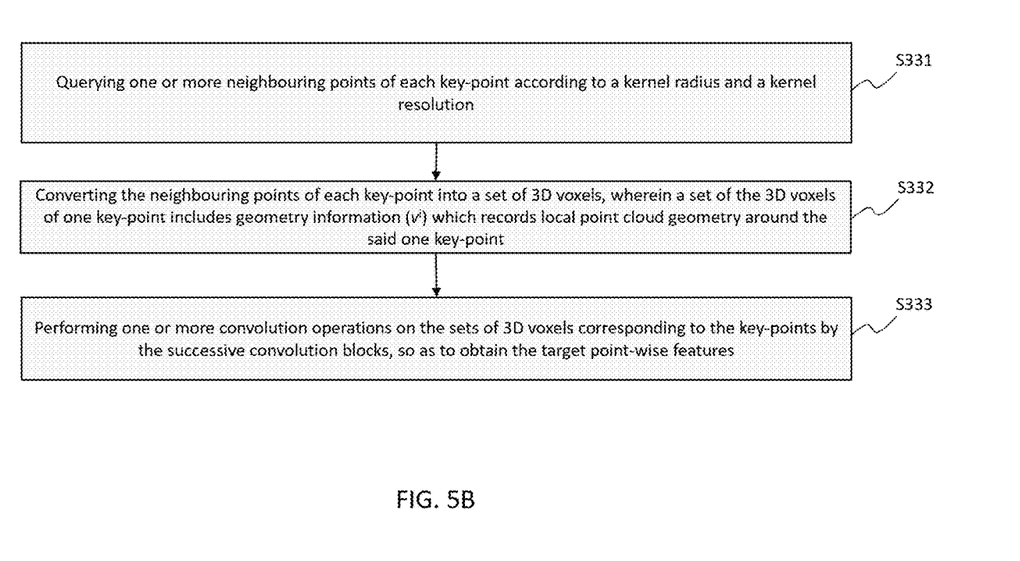
FIG. 5B depicts a flowchart of step S330 in FIG. 3.

Specifically, referring to FIG. 5B, the step of performing the hierarchical point-wise convolution on the raw data points of the point cloud according to the key-point set includes: querying one or more neighbouring points of each key-point according to a kernel radius and a kernel resolution (S331); converting the neighbouring points of each key-point into a set of 3D voxels (S332), wherein a set of the 3D voxels of one key-point includes geometry information ($v^i$) which records local point cloud geometry around the said one key-point; and performing one or more convolution operations on the sets of 3D voxels corresponding to the key-points by the successive convolution blocks, so as to obtain the target point-wise features (S333).

Furthermore, the step of querying the neighbouring points of each key-point according to the kernel radius and the kernel resolution includes: dividing the entire point cloud into further regular grids with a resolution $$\frac{2R}{k},$$

wherein R is the kernel radius, and k is the kernel resolution; and performing a convolution by setting kernel window on different key-points to obtain different sets of the neighbouring points corresponding to the key-points, wherein a set of the neighbouring points of one key-point are included by a kernel window of which a center is that said one key-point.

Moreover, the step of converting the neighbouring points of each key-point into the set of 3D voxels includes: for the neighbouring points of each key-point, fitting the neighbouring points into k×k×k 3D voxels, wherein an average-pooling strategy is used for calculating average value of the neighbouring points occupying one set of 3D voxels. Average pooling is used only for the voxels occupied by multiple points. The average value of all the multiple points will be calculated in this strategy. After obtaining the target point-wise features, the provided method further includes following steps: inputting the target point-wise features into 1-D convolutional layers to obtain RoI proposals and binary foreground classification scores; and identifying foreground data points corresponding to proposal regions according to the RoI proposals and the binary foreground classification scores.

In more detail, the purpose of the hierarchical point-wise convolution operation aims at combining the advantages of both conventional convolutions and the point-wise operations. And instead of applying these two techniques in an alternate way like PV-RCNN, in this embodiment, it directly deploys 3D convolution in a point-wise way. That is, after the extraction of key points via down-sampling, constructing local-scale 3D voxels around each key-point so that the point cloud can be parsed by 3D convolutions.

Figure 4B:
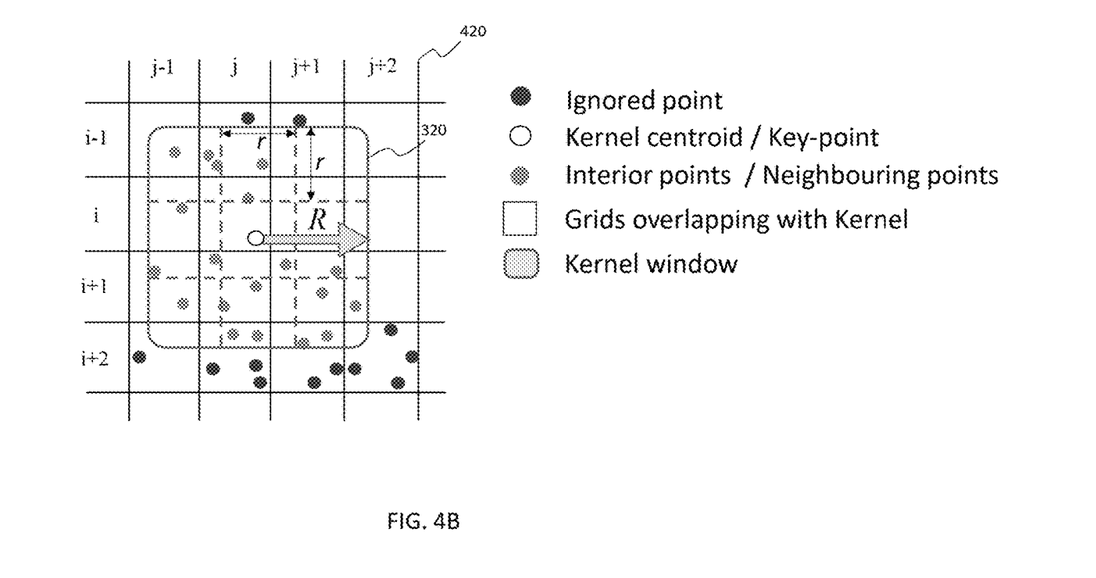
FIG. 4B depicts a schematic diagram illustrating a point-wise convolution method.

As shown in FIG. 4B, given the input point cloud $S_1=\{(p_1^i, f_1^i): i=1,2, \ldots, N_1\}$, $p_1^i \in \mathbb{R}^3$, $f_1^i \in \mathbb{R}^{c_1}$, and the subscript "1" suggests it is the first layer in the network, first down-sampling $\{p_1^i\}$ using foregoing grid-based point-wise down-sampling with the down-sampling resolution $r_1$, and get the down-sampled key-point set $\{p_2^i: i=1,2, \ldots, N_2, N_2 \leq N_1\} \subseteq \{p_1^i: =1,2, \ldots, N_1\}$. For every $p_2^i$, we query its neighbouring points in $S_1$ within a fixed radius $R_1$: $S_1^i=\{(p_1^j, f_1^j): j=1,2, \ldots, N_n^i; |p_1^j-p_2^i| \leq R_1\}$, and fit $S_1^i$ into the 3D regular voxels with resolution k×k×k. By doing so, we convert the original $S_1$ into a set of 3D voxels: $V_1=\{(p_2^i, v_1^i), i=1,2, \ldots, N_2\}$, where $v_1^i \in \mathbb{R}^{k \times k \times k \times c_1}$ encodes the local point cloud geometry around the key point $p_2^i$.

As for the convolution part, convolving the $v_1^i$ with 3D kernel $W_1 \in \mathbb{R}^{k \times k \times k \times c_1 \times c_2}$. $W_1$ has the same k×k×k resolution as $v_1^i$, while the c1 and c2 are respectively the input and output feature channels. After convolution, it has $f_2^i=v_1^i * W_1$, and $f_2^i \in \mathbb{R}^{c_2}$. At last, it gets a new point set $S_2=\{p_2^i, f_2^i\}: i=1,2, \ldots, N_2\}$, which can be treated as the input of another successive convolutional layer. Treating the Layer 0 to Layer 2 in FIG. 2C as an integrated single block, this single block represents one point-wise convolutional layer in point-wise convolution backbone of FIG. 7. In other words, in the example shown in FIG. 7, we have 8 point-wise convolutional layers of 4 convolution blocks 721 to 724, each one including "Layer 0 to Layer 2", such that it forms the hierarchical arrangement of point-wise convolutional layers that shape a backbone network for feature extraction from the raw point cloud 710. For each point-wise convolutional layer, the input point cloud is S1 and the output is known as S2. Since the convolution output features are closely associated with the point coordinates, the output $f^i$ now exactly represents the features at location $p^i$, instead of a large pooling area like conventional convolutions as shown in FIG. 2A.

The key of the provided hierarchical point-wise convolution lies on how to construct the 3D voxels $v^i$ for each key-point $p^i$. However, even after the down-sampling, the total number of remaining key-points is still considerable (~100k at most), and thus, for achieving local-scale voxelization for so many key-points in real-time, a grid-based voxelization is proposed.

As implied by the name, grid-based voxelization basically shares the similar implementation as the provided grid-based down-sampling method above. As shown in FIG. 4B, given the kernel radius R and kernel resolution k, dividing the point cloud into regular grids 420 with the resolution $$\frac{2R}{k}$$

(defined as kernel resolution in this context), and for any given kernel centroid and query radius R, fitting (searching and indexing the points found within the kernel windows) interior points into the k×k×k 3D voxels. Also, since the voxels occupied by multiple points, the average-pooling strategy is used for following convolution operation.

To accelerate this process, it needs to go through the points that lies in the grids which overlap with the kernel area (Kernel window). Also, it will apply different implementations to fulfil the different preference during training and inference phases separately.

In our method, the voxelization is performed on-the-fly in every convolutional layer with highly efficient implementations, and therefore the receptive field dynamically changes along the model depth.

Figure 7:
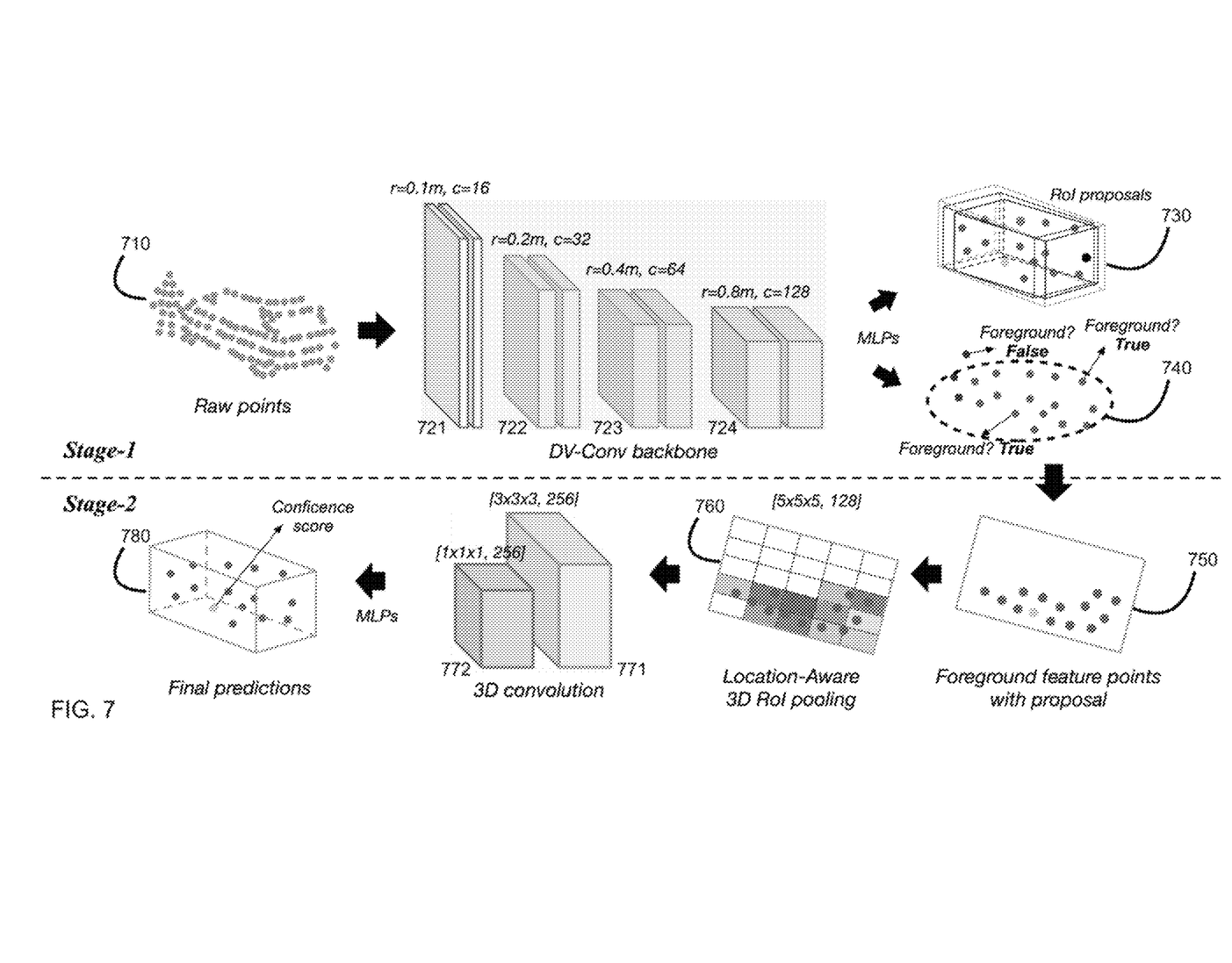
FIG. 7 depicts a schematic diagram illustrating two-stages point cloud object detection framework.

As mentioned above, the hierarchical arrangement of point-wise convolutional layers shape a backbone network for feature extraction from the raw point cloud (see the point-wise convolution backbone in FIG. 7). After the backbone network, the point-wise features are inputted into 1-D convolutional layers (as the MLPs in stage 1 of FIG. 7) to get the binary foreground classification scores and RoI encodings.

Returning to FIG. 3, in step S340, the processor 110 performs a location-aware 3D RoI pooling operation according to the target point-wise features, so as to obtain pooled point-wise features and pooled 3D voxels corresponding to the pooled point-wise features.

Figure 5C:
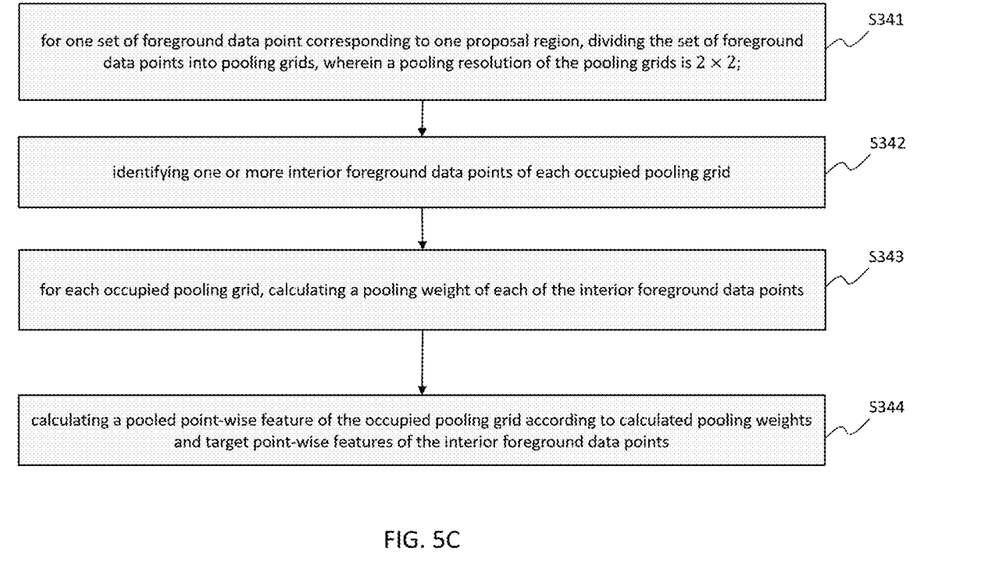
FIG. 5C depicts a flowchart of step S340 in FIG. 3.

Specifically, referring to FIG. 5C, the step of performing the location-aware 3D RoI pooling operation according to the target point-wise features includes: for one set of foreground data point corresponding to one proposal region, dividing the set of foreground data points into pooling grids, wherein a pooling resolution of the pooling grids is 2×2 (S341); and identifying one or more interior foreground data points of each occupied pooling grid (S342). And, for each occupied pooling grid, calculating a pooling weight of each of the interior foreground data points (S343); and calculating a pooled point-wise feature of the occupied pooling grid according to calculated pooling weights and target point-wise features of the interior foreground data points (S344).

Furthermore, the pooling weight $w_i$ of each of the interior foreground data points is calculated by formula (1) below:

$$w_i = e^{1-\frac{d_i}{r}} \quad (1)$$

and the pooled point-wise feature $f_{pg}$ of the occupied pooling grid is calculated by formula (2) below:

$$f_{pg} = \frac{1}{n}\sum_{i=1}^{n} w_i f_i \quad (2)$$

where $d_i$ is the distance between the interior data point and the grid center; r is the maximum dimension of pooling grid among three orientations; $f_i$ is the target point-wise feature; n is the total number of interior data points in each occupied pooling grid.

Figure 6:
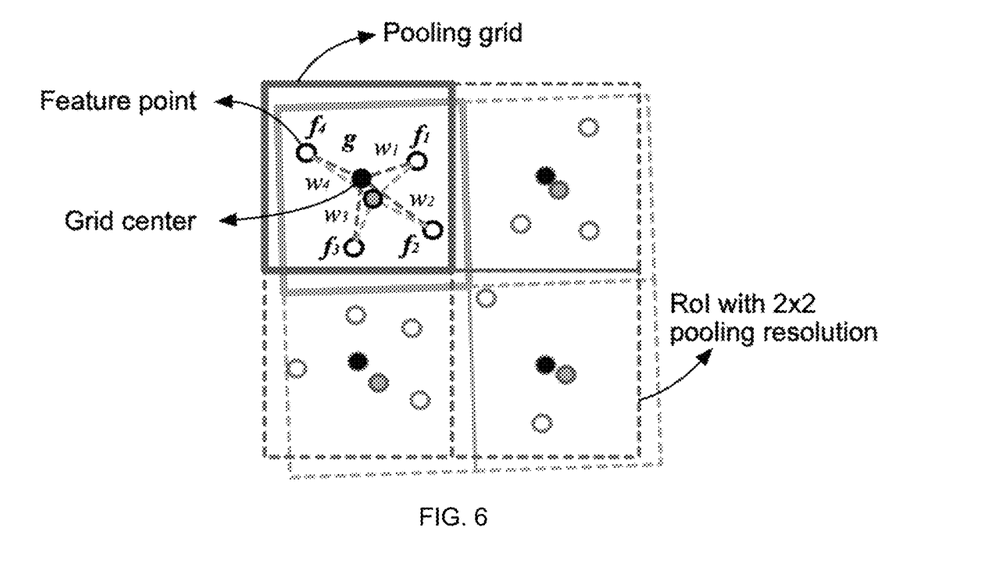
FIG. 6 depicts a schematic diagram illustrating a location-aware RoI pooling operation.

In the embodiment, as the input to the RoI pooling operation are target point-wise features, it does not have to up-sample these features, and the question remains how to efficiently aggregate the point-wise features (feature points in FIG. 6) into RoI pooling grids 610 and 620 as a pooled point-wise feature (grid center in FIG. 6). At the end of Stage 1, one or more RoI proposals are generated according to the user requirement. Then, a RoI pooling operation is performed for each of all RoI proposals. For example, FIG. 6 shows two RoI proposals are used for performing two rounds of RoI pooling operations (e.g., corresponding to the RoI pooling grids 610 and 620). However, in PV-RCNN (Point-Voxel Region-proposals Convolutional Neural Network), the features of each pooling grid are learnt from convolutions, e.g., for RoI pooling with resolution of 5×5×5, a total number of 125 convolution calculations are required, and that is for one single RoI only, thus, it is unaffordable.

Accordingly, the Location-Aware RoI Pooling method is provided for solving this problem. In brief, during the pooling operation, it weights the target point-wise features according to their geometrical distances to the pooling grid center. In detail, it gathers all the interior point-wise features $f_i$ for every pooling grid by calculates the weight for each interior points by foregoing formula (1) and calculating the pooled point-wise feature according to the features of the interior points by formula (2).

By doing so, the tiny perturbation between different RoIs can be captured, while avoid the expensive convolutions. In practice, the provided LA-pooling operation plays an essential role in a successful RoI proposal refinement.

Returning to FIG. 3, in step S350, the processor 110 performs 3D convolution operations on the pooled 3D voxels (e.g., via 771 to 772 of FIG. 7), so as to obtain represent data points, wherein each of the represent data points includes a represent feature.

Next, in step S360, the processor 110 inputs the represent data points into multi-layer perceptrons (MLPs), so as to obtain final predictions, wherein the final predications is outputted as one or more 3D object detected from the point cloud.

As a two-stage model, it uses multi-task loss functions to train models in both stages. During the stage 1, it tries to differentiate foreground points from the point cloud and generate RoI proposals for those potential foreground points at the same time. And for the RoI regression part, the IoU loss is used as the optimization target, instead of the commonly used smooth-L1 loss. The RoI regression part refers to the bounding box attributes (height, width, length centre position) in the generation of RoI proposals.

The IoU (Intersection and Union) loss has been proven more superior than the smooth-L1 for detection tasks, as it naturally reflects the bias between the predicted bounding box and ground truth. The calculation itself for 3D IoU is not difficult, but as a loss function, being differentiable is the prerequisite which is not an easy task. In previous works, 3D IoU has already been applied to the 3D point cloud detection tasks and achieved better performance compared to the smooth-L1. However, the back propagation of 3D IoU is troublesome and has to be implemented manually with tedious C++ extensions, and it believes that is one of the reasons that prevent the wide adoption of IoU loss for 3D point cloud detection. To overcome this issue, in the present disclosure, an efficient algorithm for 3D IoU calculation is provided, which is fully based on the native operations supported by the modern deep learning framework like TensorFlow and PyTorch. That means we no long have to implement the back propagation manually, and can safely leave this tedious job to the auto differentiation functions of deep learning frameworks.

Given a pair of predicted bounding box and its corresponding ground truth (assuming bounding box only has the yaw-axis rotation), first converting two boxes to 2D BEV view, and calculate the overall 16 intersections between two boxes (including extension of edges). Next, together with the 4×2=8 vertexes of both boxes, making judgement for all of the total 24 points to select points that are inside both boxes. For the selected points, sorting them by the counter-clock order, and calculate the geometrical area of the intersection part by shoelace algorithm. After that, the 3D IoU result can be obtained without difficulty, since the calculation of height intersection is quite straightforward. All the calculations are implemented in a batch-wise pattern, and it tries to avoid using any looping statements for better efficiency.

The multi-task loss function used in stage 1 is the formula (3) below:

$$L_{total}=L_{cls}+L_{iou}+L_{rot} \quad (3)$$

Where $L_{cls}$ is the focal loss for foreground classification, $L_{iou}$ is the IoU loss and $L_{iou}=1-\text{IoU}$; $L_{rot}$ is the smooth-L1 loss for yaw rotations, and it is calculated as formula (4) below:

$$L_{rot}=\text{SmoothL1}(\sin(r_p-r_g)) \quad (4)$$

$L_{iou}$ and $L_{rot}$ are only calculated for the foreground points, and the $L_{total}$ is the summation of point-wise average of all the three parts.

Regulating on the sine of the difference between predicted rotation angle $r_p$ and ground truth $r_g$. The reason why $L_{rot}$ is still needed in addition to $L_{iou}$ is that, IoU loss does not have any regulate on the orientations. Without $L_{rot}$, the learnt bounding boxes may have the correct appearances, but with swapped width and length dimensions and offset of π/2 in yaw rotation.

The loss function for the stage 2 is presented by formula (5) below:

$$L_{total}=L_{conf}+L_{iou}+L_{rot}+L_{flip} \quad (5)$$

Where $L_{conf}$ is the IoU-guided confidence loss, which is also applied the previous works. Its definition is given as below: for the RoI proposal returned from the stage 1, first calculating target confidence by formula (6):

$$y_i=\min(1, \max(0, 2\text{IoU}_i-0.5)) \quad (6)$$

Where $y_i$ is the target confidence for the stage 2, and the $L_{conf}$ is defined by formula (7) below:

$$L_{conf}=y_i\log(y)-(1-y_i)\log(1-y_i) \quad (7)$$

Where $y_i$ is the confidence score predicted by the model. $L_{iou}$ and $L_{rot}$ possess the same definition as stage 1, as for $L_{flip}$, it regulates a binary classification to decide whether the predicted bounding box should be rotated with angle π, as the $L_{rot}$ in both stages cannot differentiate the facing orientation (offset by π).

Following the common practice, the target bounding boxes parameters are presented by formulas (8) and (9) below:

$$\Delta x = \frac{x_g - x_a}{d_a}, \Delta y = \frac{y_g - y_a}{d_a}, \Delta z = \frac{z_g - z_a}{h_a}, \quad (8)$$

$$\Delta w = \log\left(\frac{w_g}{w_a}\right), \Delta l = \log\left(\frac{l_g}{l_a}\right), \Delta h = \log\left(\frac{h_g}{h_a}\right), \Delta\theta = \theta_g - \theta_a \quad (9)$$

where $\Delta d=\sqrt{(w_a)^2+(l_a)^2}$; x, y, z are the centroid coordinates of bounding boxes; w, l, h are the three dimensions alone x, y and z axes, and θ is the rotation angle alone z-axis (yaw). The subscript "g" stands for the parameters for the ground truth, while "a" stands for the parameters for anchors (stage 1) or RoI proposals (stage 2).

Referring to FIG. 7, the backbone network is based on the hierarchical point-wise convolutional layer. The backbone is composed of four convolution blocks 721 to 724, and each block includes two identical point-wise convolutional layers. The down-sampling resolution and the kernel resolution are the same within each block, and are set as 0.1m (meter), 0.2m, 0.4m, 0.8m for each block; the number of feature channels (c) for each block are set as 16, 32, 64 and 128. The raw data points of the point cloud 710 is inputted into the point-wise convolution backbone network to output target point-wise features F1 via key-point extraction. The output features F1 from the last layer of the backbone are fed into the stage 2, together with the RoI proposals 730. The binary foreground classification scores corresponding to the features F1 are used for determining whether the features F1 is foreground or not. The foreground feature points are obtained at the end of Stage 1 shown in FIG. 7. The foreground feature points and the corresponding RoI proposals are identified via the MLPs in stage 1. The foreground feature points with proposal can be considered as the initial guess of the prediction, which then be passed to Stage 2 to generate the final predictions.

The LA-RoI pooling operation 760 transforms the foreground feature points with proposal(s) (e.g., 750) into 5×5×5 3D voxels V1, and pass them to the 3D convolutions 771 and 772. Applying "valid" padding strategy for the 3D convolution, and the dimension are reduced from 5×5×5 to 1×1×1 after two successive convolutional layers 771-772. Shrinking the feature maps along the 1×1×1 dimension and get the point-wise output feature representations F2 (e.g., represent features F2) regarding each RoI pooling region. Finally, we feed these features into MLPs to return the final predictions 780. The confidence score is served as a information to allow users understand how reliable/confident the prediction is. The final predictions are the target of the 3D point cloud object detection using neural network. In this case, it is the bounding box of the point belonging to a specific object, e.g., a car, depending on the different given tasks. Depending on the purpose of tasks, users can use the predictions to perform various types of data analysis. For example, in traffic flow analysis, user can understand the vehicle flow, trajectory, vehicle speed over time, and vehicle class by determining the trace of the final predictions corresponding to vehicles.

Thus, a grid-based key-points extraction and hierarchical point-wise voxelization methods are provided to takes place of the commonly adopted farthest point sampling (FPS) +k-nearest neighbours (k-NN) strategy, which are time consuming and memory-hungry. And, as a two-stage detection framework, a location-aware RoI pooling, a lightweight pooling method that is 3× faster and 4× more memory efficient than the previous work, is provided without losing accuracy significantly.

Moreover, for further performance improvement, a 3D IoU loss for bounding box regression is adopted. In this work, an efficient algorithm for 3D IoU loss calculation is provided, which is fully based on the native TensorFlow operations and can be implemented with less than 200 lines of Python code. The tedious back-propagation of 3D IoU now can be left to the deep learning frameworks, and no longer has to be manually implemented. That is the efficiency of electronic device handling the 3D cloud point object detection is much improved based on the method provided by the presented disclosure.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for performing a 3D point cloud object detection using grid-based key-points extraction and hierarchical point-wise voxelization by an electronic device, comprising:

receiving, by a processor of the electronic device, an object data comprising a point cloud of a plurality of sensed points, wherein the point cloud comprises a plurality of raw data points respectively corresponding to the sensed points, and each of the raw data points comprises a point coordinate of corresponding sensed point and a corresponding point-wise feature with one or more channels;

performing, by the processor, a grid-based key-points extraction on the raw data points of the point cloud, so as to obtain a key-point set having one or more key-points among the raw data points;

performing, by the processor, a hierarchical point-wise convolution on the raw data points of the point cloud according to the key-point set by a neural network having one or more successive convolution blocks, so as to obtain a plurality of target point-wise features corresponding to a plurality of target data points;

performing, by the processor, a location-aware 3D RoI (Region of interest) pooling operation according to the target point-wise features, so as to obtain pooled point-wise features and pooled 3D voxels corresponding to the pooled point-wise features;

performing, by the processor, 3D convolution operations on the pooled 3D voxels, so as to obtain represent data points, wherein each of the represent data points includes a represent feature; and inputting, by the processor, the represent data points into multi-layer perceptrons, so as to obtain final predictions, wherein the final predications is outputted as one or more 3D object detected from the point cloud.

2. The method of claim 1, wherein the step of performing the grid-based key-points extraction on the raw data points of the point cloud comprising:

dividing the entire point cloud into regular grids with a predetermined grid length, wherein the predetermined grid length represents a down-sampling resolution;

calculating a grid index of each sensed points in the regular grids, wherein the grid index of one sensed point indicates which grid the said one sensed point belongs to; and for each occupied grid, selecting one represent sensed point in each occupied grid as the key-point of the occupied grid, so as to obtain the key-point set in which each of the key-points has unique grid index.

3. The method of claim 1, wherein the step of performing the hierarchical point-wise convolution on the raw data points of the point cloud according to the key-point set comprising:

querying one or more neighbouring points of each key-point according to a kernel radius and a kernel resolution;

converting the neighbouring points of each key-point into a set of 3D voxels, wherein a set of the 3D voxels of one key-point includes geometry information ($v^i$) which records local point cloud geometry around the said one key-point; and performing one or more convolution operations on the sets of 3D voxels corresponding to the key-points by the successive convolution blocks, so as to obtain the target point-wise features.

4. The method of claim 3, wherein the step of querying the neighbouring points of each key-point according to the kernel radius and the kernel resolution comprising:

dividing the entire point cloud into further regular grids with a resolution $$\frac{2R}{k},$$

wherein R is the kernel radius, and k is the kernel resolution; and performing a convolution by setting kernel window on different key-points to obtain different sets of the neighbouring points corresponding to the key-points, wherein a set of the neighbouring points of one key-point are included by a kernel window of which a center is that said one key-point.

5. The method of claim 3, wherein the step of converting the neighbouring points of each key-point into the set of 3D voxels comprising:

for the neighbouring points of each key-point, fitting the neighbouring points into k×k×k 3D voxels, wherein an average-pooling strategy is used for calculating average value of the neighbouring points occupying one set of 3D voxels.

6. The method of claim 1, after obtaining the target point-wise features, the method further comprises:

inputting the target point-wise features into 1-D convolutional layers to obtain RoI proposals and binary foreground classification scores; and identifying foreground data points corresponding to proposal regions according to the RoI proposals and the binary foreground classification scores.

7. The method of claim 6, wherein the step of performing the location-aware 3D RoI pooling operation according to the target point-wise features comprising:

for one set of foreground data point corresponding to one proposal region, dividing the set of foreground data points into pooling grids, wherein a pooling resolution of the pooling grids is 2×2; and identifying one or more interior foreground data points of each occupied pooling grid; and for each occupied pooling grid, calculating a pooling weight of each of the interior foreground data points; and calculating a pooled point-wise feature of the occupied pooling grid according to calculated pooling weights and target point-wise features of the interior foreground data points.

8. The method of claim 7, wherein the pooling weight $w_i$ of each of the interior foreground data points is calculated by formula below:

$$w_i = e^{1-\frac{d_i}{r}}$$

and the pooled point-wise feature $f_{pg}$ of the occupied pooling grid is calculated by formula below:

$$f_{pg} = \frac{1}{n}\sum_{i=1}^{n} w_i f_i$$

where $d_i$ is the distance between the interior data point and the grid center; r is the maximum dimension of pooling grid among three orientations; $f_i$ is the target point-wise feature; n is the total number of interior data points in each occupied pooling grid.

9. An electronic device for performing a 3D point cloud object detection using grid-based key-points extraction and hierarchical point-wise voxel i zati on, comprising:

a processor, configured to execute machine instructions to implement a computer-implemented method, the method comprising:

receiving, by the processor, an object data comprising a point cloud of a plurality of sensed points, wherein the point cloud comprises a plurality of raw data points respectively corresponding to the sensed points, and each of the raw data points comprises a point coordinate of corresponding sensed point and a corresponding point-wise feature with one or more channels;

performing, by the processor, a grid-based key-points extraction on the raw data points of the point cloud, so as to obtain a key-point set having one or more key-points among the raw data points;

performing, by the processor, a hierarchical point-wise convolution on the raw data points of the point cloud according to the key-point set by a neural network having one or more successive convolution blocks, so as to obtain a plurality of target point-wise features corresponding to a plurality of target data points;

performing, by the processor, a location-aware 3D RoI pooling operation according to the target point-wise features, so as to obtain pooled point-wise features and pooled 3D voxels corresponding to the pooled point-wise features;

performing, by the processor, 3D convolution operations on the pooled 3D voxels, so as to obtain represent data points, wherein each of the represent data points includes a represent feature; and inputting, by the processor, the represent data points into multi-layer perceptrons, so as to obtain final predictions, wherein the final predications is outputted as one or more 3D object detected from the point cloud.

* * * * *